(12) United States Patent
Hennessy et al.

(10) Patent No.: US 7,938,240 B2
(45) Date of Patent: May 10, 2011

(54) VISCOUS CLUTCH

(75) Inventors: David R. Hennessy, Burnsville, MN (US); Bastian Brand, Schonungen (DE)

(73) Assignee: Horton, Inc., Roseville, MN (US)

( * ) Notice: Subject to any disclaimer, the term of this patent is extended or adjusted under 35 U.S.C. 154(b) by 295 days.

(21) Appl. No.: 11/989,495

(22) PCT Filed: Jul. 28, 2006

(86) PCT No.: PCT/US2006/029759
§ 371 (c)(1),
(2), (4) Date: Jan. 25, 2008

(87) PCT Pub. No.: WO2007/016494
PCT Pub. Date: Feb. 8, 2007

(65) Prior Publication Data
US 2010/0140040 A1    Jun. 10, 2010

Related U.S. Application Data

(60) Provisional application No. 60/704,063, filed on Jul. 29, 2005.

(51) Int. Cl.
*F16D 35/02* (2006.01)
(52) U.S. Cl. .................................. 192/58.61; 192/58.8
(58) Field of Classification Search .............. 192/58.61
See application file for complete search history.

(56) References Cited

U.S. PATENT DOCUMENTS

| | | | |
|---|---|---|---|
| 3,327,822 A | 6/1967 | Spencer | |
| 4,046,239 A | 9/1977 | Tinholt | |
| 4,246,995 A | 1/1981 | Gee | |
| 4,271,945 A | 6/1981 | Budinski | |
| 4,281,750 A | 8/1981 | Clancey | |
| 4,305,491 A | 12/1981 | Rohrer | |
| 4,355,709 A | 10/1982 | Light | |
| 4,362,226 A | 12/1982 | Gee | |
| 4,556,138 A | 12/1985 | Martin et al. | |
| 4,779,323 A | 10/1988 | Bloemendaal | |
| 4,987,986 A | 1/1991 | Kennedy et al. | |
| 5,152,383 A | 10/1992 | Boyer et al. | |
| 5,226,517 A | 7/1993 | Grochowski | |
| 5,285,699 A * | 2/1994 | Walls et al. ................ | 74/572.12 |
| 5,511,643 A | 4/1996 | Brown | |
| 5,722,523 A | 3/1998 | Martin | |
| 5,836,335 A | 11/1998 | Harms et al. | |
| 5,893,442 A | 4/1999 | Light | |

(Continued)

FOREIGN PATENT DOCUMENTS

DE    3148872 A1    6/1983

(Continued)

*Primary Examiner* — Rodney H Bonck
(74) *Attorney, Agent, or Firm* — Kinney & Lange, P.A.

(57) ABSTRACT

A viscous clutch assembly (100) includes a rotational input structure (110), a rotor (104) attached to the rotational input structure (110), a selectively rotatable member (102) surrounding the rotor (104) and rotatably supported by the rotational input structure (110), an electromagnetic coil (108) positioned relative to a driven side of the rotor (104), a valve assembly (106) supported by the rotor (104), and a magnetic flux circuit for controlling the valve assembly (106) with magnetic flux generated by the electromagnetic coil (108). The valve assembly (106) includes a cover plate (140) for regulating flow of a shear fluid. The rotational input structure (110) comprises a material capable of conducting magnetic flux. The magnetic flux circuit is configured to include no more than four air gaps ($G_1$-$G_4$).

29 Claims, 13 Drawing Sheets

U.S. PATENT DOCUMENTS

| | | |
|---|---|---|
| 5,896,964 A | 4/1999 | Johnston et al. |
| 5,937,983 A | 8/1999 | Martin et al. |
| 5,992,594 A | 11/1999 | Herrle et al. |
| 6,026,943 A | 2/2000 | Fuchs et al. |
| 6,032,775 A | 3/2000 | Martin |
| 6,347,929 B1 * | 2/2002 | Cooper et al. ............ 417/423.7 |
| 6,419,064 B1 | 7/2002 | Krammer |
| 6,443,283 B1 | 9/2002 | Augenstein et al. |
| 6,530,462 B2 | 3/2003 | Lutz |
| 6,550,596 B2 | 4/2003 | Shiozaki et al. |
| 6,651,309 B2 * | 11/2003 | Gay et al. ..................... 29/596 |
| 6,695,113 B2 | 2/2004 | Lutz |
| 6,732,845 B2 * | 5/2004 | Tilly et al. ................. 192/58.61 |
| 7,191,883 B2 | 3/2007 | Angermaier |
| 2004/0084273 A1 | 5/2004 | May et al. |
| 2004/0124057 A1 | 7/2004 | Shiozaki et al. |
| 2004/0168877 A1 | 9/2004 | Drager et al. |
| 2005/0189194 A1 | 9/2005 | Lindauer et al. |
| 2006/0042902 A1 | 3/2006 | Boyer |

FOREIGN PATENT DOCUMENTS

| | | |
|---|---|---|
| DE | 3243967 A1 | 5/1984 |
| DE | 3823871 A1 | 1/1990 |
| DE | 3941834 A1 | 6/1991 |
| DE | 4011528 A1 | 10/1991 |
| DE | 19741073 A1 | 3/1999 |
| DE | 19842343 A1 | 3/2000 |
| DE | 10219872 A1 | 11/2003 |
| EP | 0562226 B1 | 9/1993 |
| GB | 2374124 A | 10/2002 |

\* cited by examiner

VISCOUS CLUTCH

BACKGROUND OF THE INVENTION

Clutches are utilized in a variety of settings. For instance, fan clutches are used in automotive settings to permit selective engagement of a fan to help cool an engine, and viscous fan clutches are commonly used with medium to heavy duty trucks. Generally speaking, these viscous fan clutches operate by introducing a shear fluid to a working chamber to frictionally engage two components, such as a rotor connected to a drive input and a housing connected to a fan, by transmitting rotational energy via the shear fluid. Such a viscous clutch can engage rotation of the fan when shear fluid is present in the working chamber and disengage rotation of the fan when the shear fluid is removed from the working chamber.

Many known viscous clutches are electromagnetically actuated. That is, these viscous clutches include an electromagnetic coil that can generate magnetic flux to control the operation of a valve that, in turn, regulates flow of shear fluid from a fluid supply reservoir to the working chamber. However, there are numerous difficulties in locating the valve and the coil in such a way that the rotational capabilities of the drive are adequately maintained, while also permitting efficient and effective control of fluid flow with the valve.

For example, the reservoir of a viscous clutch is typically attached to the housing of the clutch. Fan blades are connected to the housing. The housing, the reservoir and the fan blades are all generally either stationary or are rotating at a relatively slow speed when the clutch is in an "off" or disengaged condition. A relatively stationary reservoir imparts little kinetic energy to the shear fluid contained inside, which can slow the response time for the clutch to move shear fluid from the reservoir to the working chamber when the valve is opened. But attaching the reservoir to the rotor is problematic, because it is difficult to provide a suitable valve assembly that can rotate with the rotor and yet still be effectively and efficiently controlled by the coil, which generally must be rotationally fixed to enable reliable electrical connections to be made to the coil. Moreover, many flux circuit arrangements for magnetically linking the valve and the coil are undesirable, because the size and power requirements for a coil capable of generating sufficient magnetic flux presents a host of problems. Large coils undesirably add additional weight and cost, and, in addition, can exceed allowable current or voltage requirements for a particular engine, which are typically engine-wide parameters established with regard to the electronic engine controller for the vehicle in which the clutch is installed.

BRIEF SUMMARY OF THE INVENTION

A viscous clutch assembly includes a rotational input structure, a rotor attached to the rotational input structure, a selectively rotatable member surrounding the rotor and rotatably supported by the rotational input structure, an electromagnetic coil positioned relative to a driven side of the rotor, a valve assembly supported by the rotor, and a magnetic flux circuit for controlling the valve assembly with magnetic flux generated by the electromagnetic coil. The valve assembly includes a cover plate for regulating flow of a shear fluid. The rotational input structure comprises a material capable of conducting magnetic flux. The magnetic flux circuit is configured to include no more than four air gaps.

DETAILED DESCRIPTION

In general, an electromagnetically actuated viscous clutch according to the present invention permits selective engagement between an input component and an output component, for example, to selectively drive a fan as a function of a rotational input from a motor. The clutch includes a fluid reservoir and a valve assembly, which are both supported by a rotor of the clutch and rotate with the rotor. The valve assembly regulates fluid flow from the reservoir to control clutch engagement, and is controlled via a magnetic flux circuit that transmits magnetic flux generated by an electromagnetic coil positioned relative to a rear or driven side of a rotor. The valve assembly includes an armature, and is supported by a rotor such that fingers of the armature extend between front and rear sides of the rotor through a set of openings. A magnetic flux conducting insert is included that extends through a rear or base portion of a clutch housing. A magnetic flux conducting pole plate is also connected at a front end of a shaft. The magnetic flux circuit allows magnetic flux from the coil to pass to the insert in the housing, from the insert to the armature of the valve assembly, from the armature to the pole plate, from the pole plate to the shaft, and from the shaft to the coil. The circuit requires no more than four air gaps, and at least three of those air gaps can be substantially radially disposed.

U.S. Provisional Patent Application Ser. No. 60/704,063, entitled VISCOUS CLUTCH and filed Jul. 29, 2005, is hereby incorporated by reference in its entirety.

Figure 1:
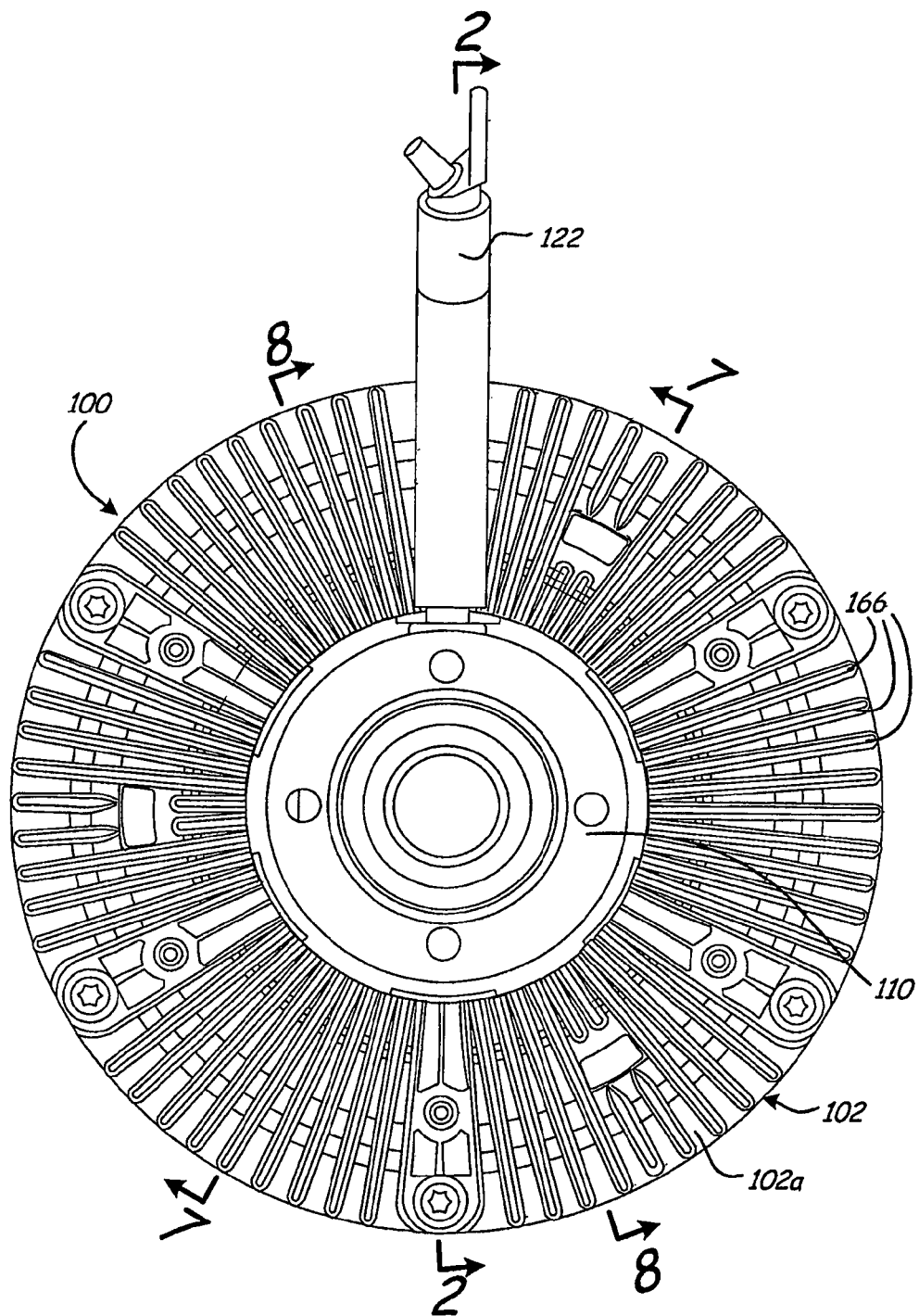
FIG. 1 is a rear view of a viscous clutch according to the present invention.
Figure 2A:
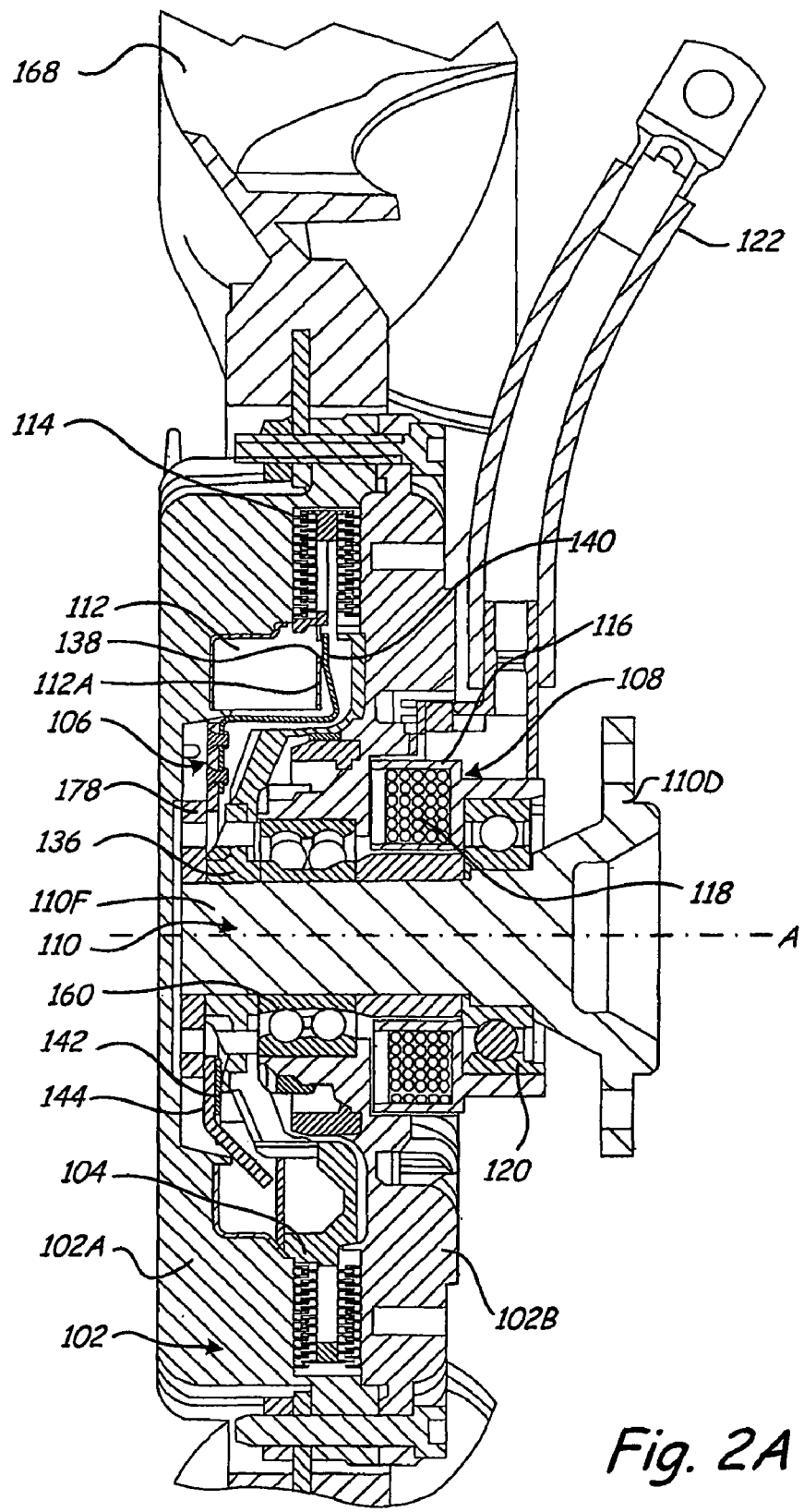
FIG. 2A is a cross-sectional view of the viscous clutch, taken along line 2-2 in FIG. 1.
Figure 2B:
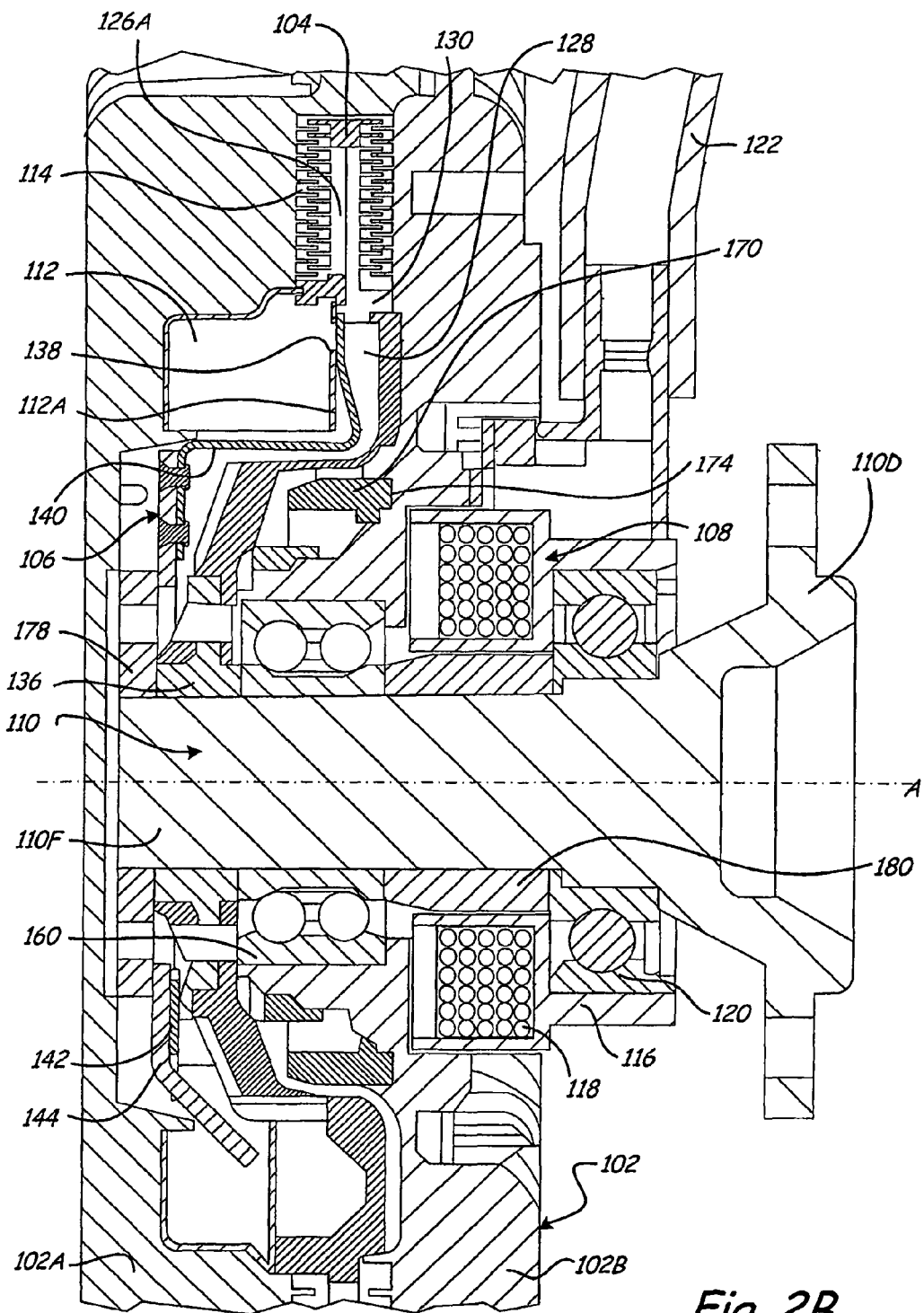
FIG. 2B is an enlarged view of a portion of the cross-section shown in FIG. 2A.

FIG. 1 is a rear view of an electromagnetically actuated viscous clutch 100, showing the rear or driven side of the clutch 100. FIG. 2A is a cross-sectional view of the clutch 100 taken along line 2-2 in FIG. 1. FIG. 2B is an enlarged view of a portion of the cross-section shown in FIG. 2A. As shown in FIGS. 1-2B, the clutch 100 includes a two-part housing 102, a rotor 104, a valve assembly 106, an electromagnetic coil assembly 108, a shaft 110, and a reservoir 112. A working chamber 114 is formed between the housing 102 and the rotor 104 where a shear fluid (e.g., a conventional silicon oil shear fluid) can flow. For simplicity, no shear fluid is shown in the figures.

The shaft 110 provides a rotational drive input to the clutch. It is made of a metallic material capable of conducting magnetic flux, such as steel. As will be understood by those of ordinary skill in the art, a driven end 110D of the shaft 110 can be connected directly to a rotational output of a motor, linked to a rotational output of a motor through belts and sheaves, or provided with some other form of rotational drive input. The shaft 110 defines an axis of rotation A for the clutch 100.

The electromagnetic coil assembly 108 includes a coil cup 116 and a wound coil 118 that is inserted into the cup 116 and fixed inside the cup (e.g. through potting). The coil cup 116 can be made of steel, and the wound coil 118 can be formed of wound copper wire. The coil assembly 108 is designed to maximize electromagnetic force generated by the coil assembly 108 within allowable limits. The coil assembly 108 can be a relatively small unit designed so as not to exceed allowable current or voltage requirements established by the requirements of an electronic engine controller (not shown) for a vehicle in which the clutch 100 is installed. The coil assembly 108 is supported relative to a rear or driven side of the clutch 100 by a single row ball bearing set 120, which is mounted on the shaft 110. The coil assembly 108 is tethered, such that it is rotationally fixed with respect to an external point (e.g., fixed to a frame of a vehicle in which the clutch 100 is mounted). A wiring conduit 122 extends from the coil assembly 108 to provide for electrical connections to other vehicle components (not shown) such as a power supply, an electronic engine controller, etc.

Figure 2C:
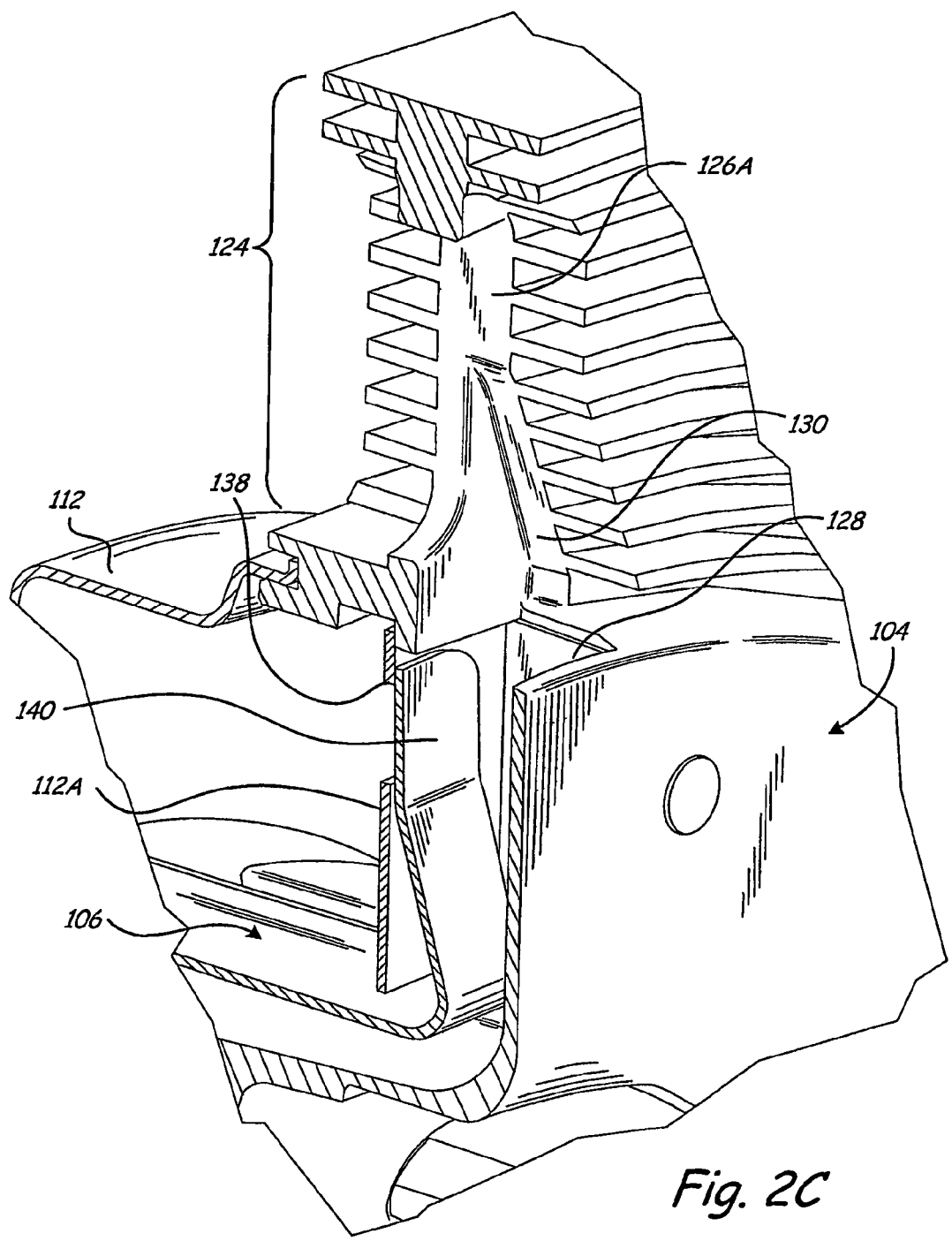
FIG. 2C is a cross-sectional perspective view of a portion of the clutch, taken along line 2-2 in FIG. 1.
Figure 3:
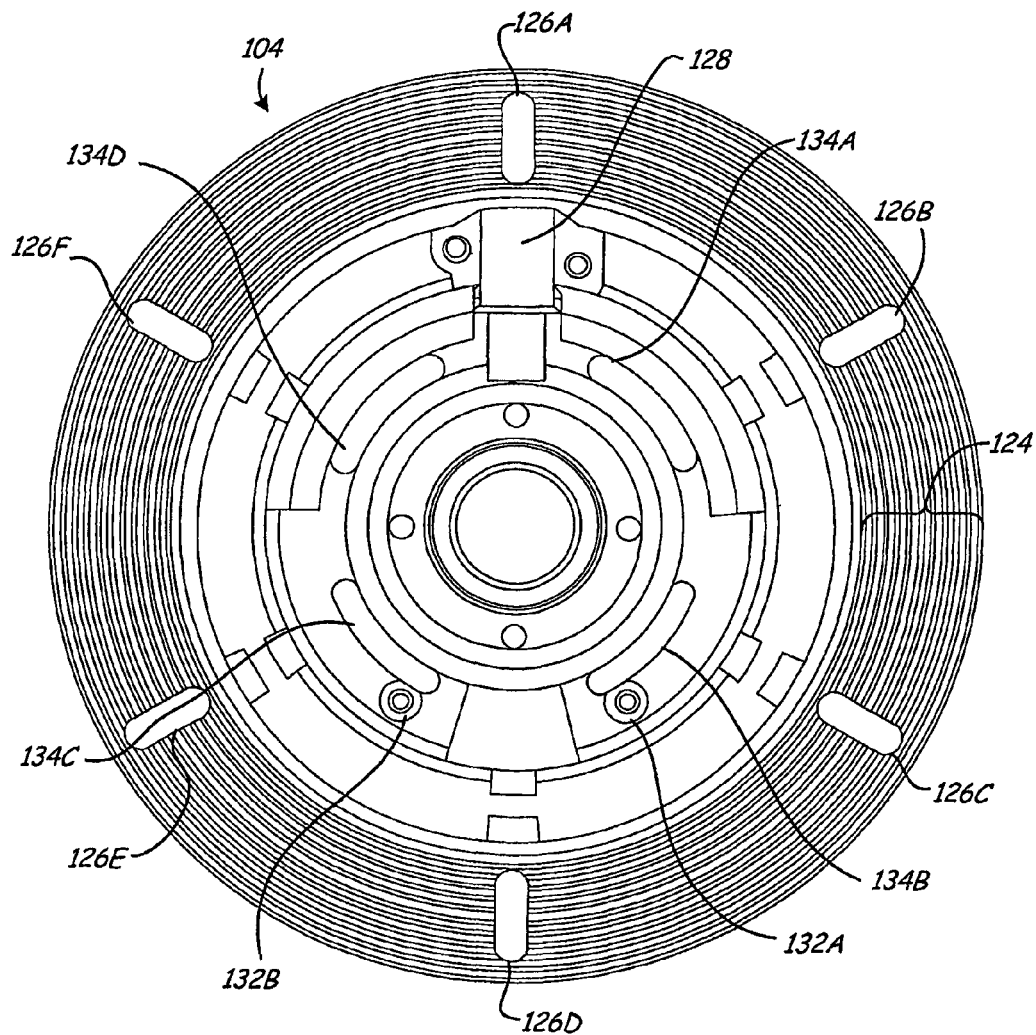
FIG. 3 is a front view of a rotor of the viscous clutch of FIGS. 1-2C.

The rotor 104 is located within the housing 102, and is generally surrounded by the housing 102. FIG. 2C is a cross-sectional perspective view of a portion of the clutch 100, taken along line 2-2 in FIG. 1, showing the rotor 104. The housing 102 is omitted in FIG. 2C for clarity. FIG. 3 is a front view of the rotor 104 shown in isolation. As shown in FIGS. 2A-3, the rotor 104 is generally disc-shaped, and has an outer diameter (OD) portion that is axially displaced with respect to an inner diameter (ID) portion, which helps reduce the overall axial size of the clutch 100 and helps align forces within the clutch 100 in a desirable manner during operation. The rotor 104 has a number of concentric annular ribs (collectively designated by reference number 124) on both its front and rear sides near the OD portion in a conventional arrangement. The annular ribs 124 face the working chamber 114 for generating frictional engagement force when shear fluid is present in the working chamber 114 to engage the clutch 100. The rotor 104 can be formed by casting, and the ribs 124 can be formed by machining.

Six generally oval fluid openings 126A-126F are formed through the rotor 104, near the OD of the rotor 104, in order to permit shear fluid to pass between the front and rear sides of the rotor 104 in the working chamber 114. A greater or lesser number of fluid openings through the rotor 104 can be provided in alternative embodiments. The fluid openings 126A-126F can be formed by machining.

A radially extending channel 128 is formed in the front side of the rotor 104 radially inward of the annular ribs 124. The radial channel 128 creates a space for the valve assembly 106 between the reservoir 112 and the front side of the rotor 104. A groove 130 is formed in the back side of the rotor 104, providing a fluid path that connects the channel 128 and the fluid opening 126A (see FIG. 2C). The functions of the channel 128 and the groove 130 are explained further below.

Holes 132A and 132B are provided in the rotor 104 for securing the valve assembly 106 on the front side of the rotor 104 with fasteners, such as with screws or bolts. Four elongate arcuate openings 134A-134D are provided slightly radially outward of the ID of the rotor 104, between the ID of the rotor 104 and the annular ribs 124. The arcuate openings 134A-134D each have a slot-like shape and are substantially equally spaced about the axis A. As explained further below, the arcuate openings 134A-134D allow movable portions of the valve assembly 106 to pass through the rotor 104.

The rotor 104 is mounted directly to the shaft 110 (see FIGS. 2A and 2B), and is rotatably fixed to the shaft 110 for co-rotation therewith. The rotor 104 is made of a lightweight non-magnetic metallic material (i.e., a lightweight material that is not a good conductor of magnetic flux), such as aluminum. An insert 136, made of a relatively hard metallic non-magnetic material, such as stainless steel, is located at the ID of the rotor 104 to provide a robust mount between the rotor 104 and the shaft 110. The insert 136 constitutes a hub portion of the rotor 104. The arcuate openings 134A-134D through the rotor 104 also extend through the insert 136. The insert 136 can be pre-formed and the material of the rotor 104 cast around the insert 136. The attachment of the shaft 110 to the rotor 104 can be made as a pressed, knurled joint as an end of the shaft 110 is rolled up against the rotor 104 to hold it mechanically in the axial direction, although other types of connections (e.g., threaded connections) can be used in alternative embodiments.

As shown in FIGS. 2A-2C, the reservoir 112 is mounted to the rotor 104 for holding a supply of shear fluid, and the reservoir 112 rotates with the rotor 104. In the embodiment shown, the reservoir 112 is mounted between the ID and OD of the rotor 104 by a swaged connection, although in alternative embodiments the position and attachment of the reservoir 112 can vary. The reservoir 112 generally has an annular configuration, and is similar to well-known reservoir designs for viscous clutches. An opening 138 (i.e., a return bore) in a rear plate 112A of the reservoir 112 faces the front side of the rotor 104. The reservoir 112 holds substantially all of the shear fluid while the clutch 100 is disengaged, that is, when the valve assembly 106 is in a closed position as shown in FIGS. 2A-2C. Shear fluid can pass out of the reservoir 112 through the opening 138 when the valve assembly 106 is in an open position to engage the clutch 100.

Figure 4:
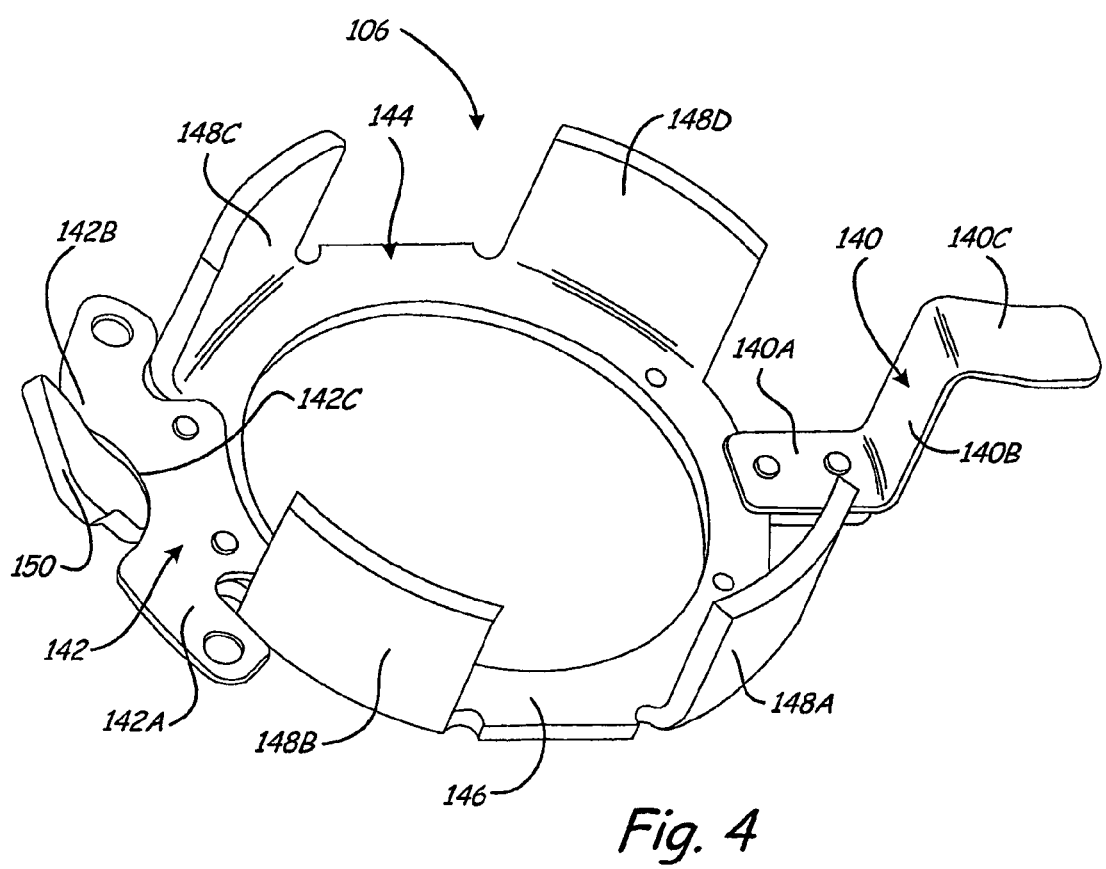
FIG. 4 is a perspective view of the valve assembly of the viscous clutch of FIGS. 1-2C.
Figure 5:
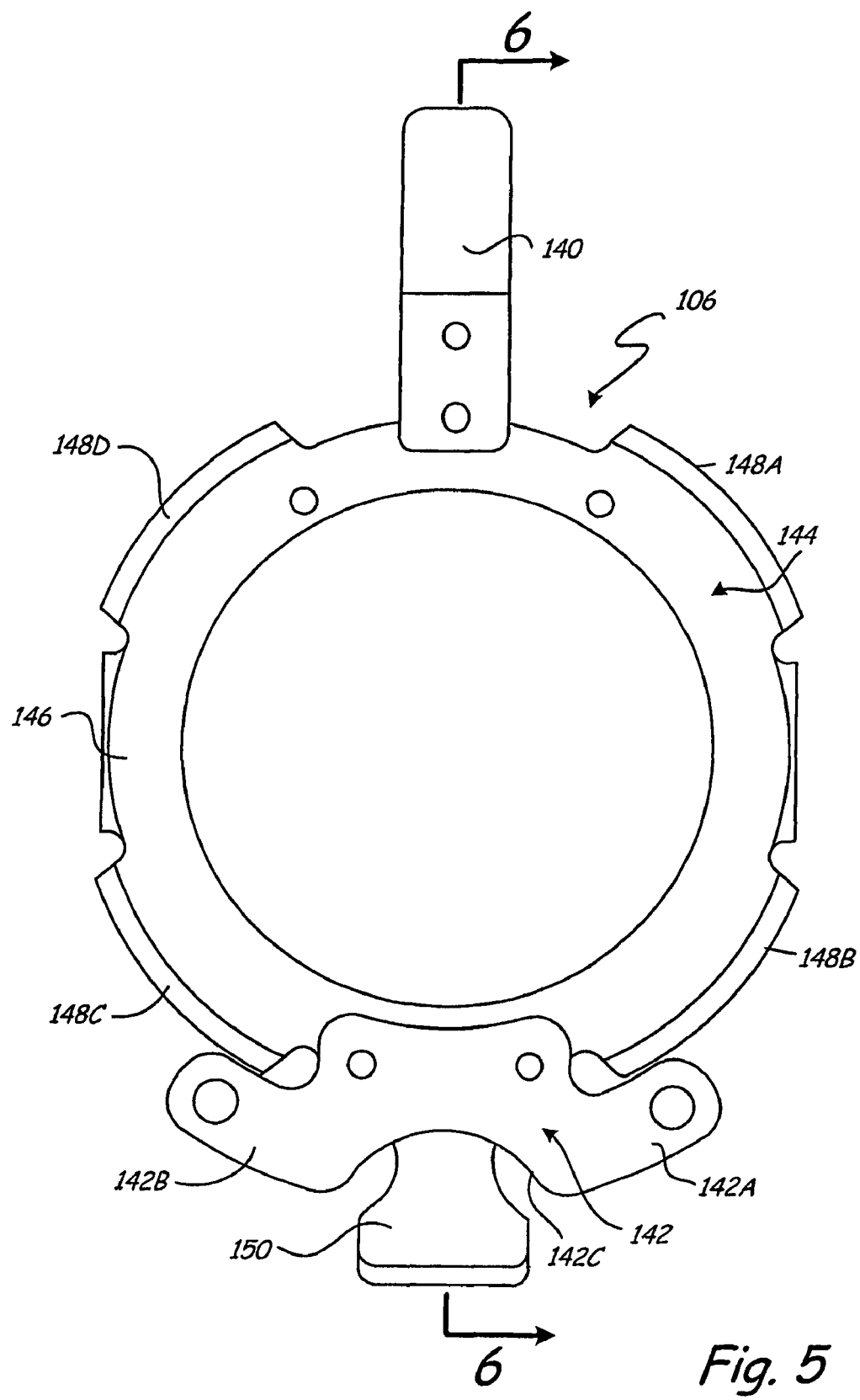
FIG. 5 is a rear view of the valve assembly of FIG. 4.
Figure 6:
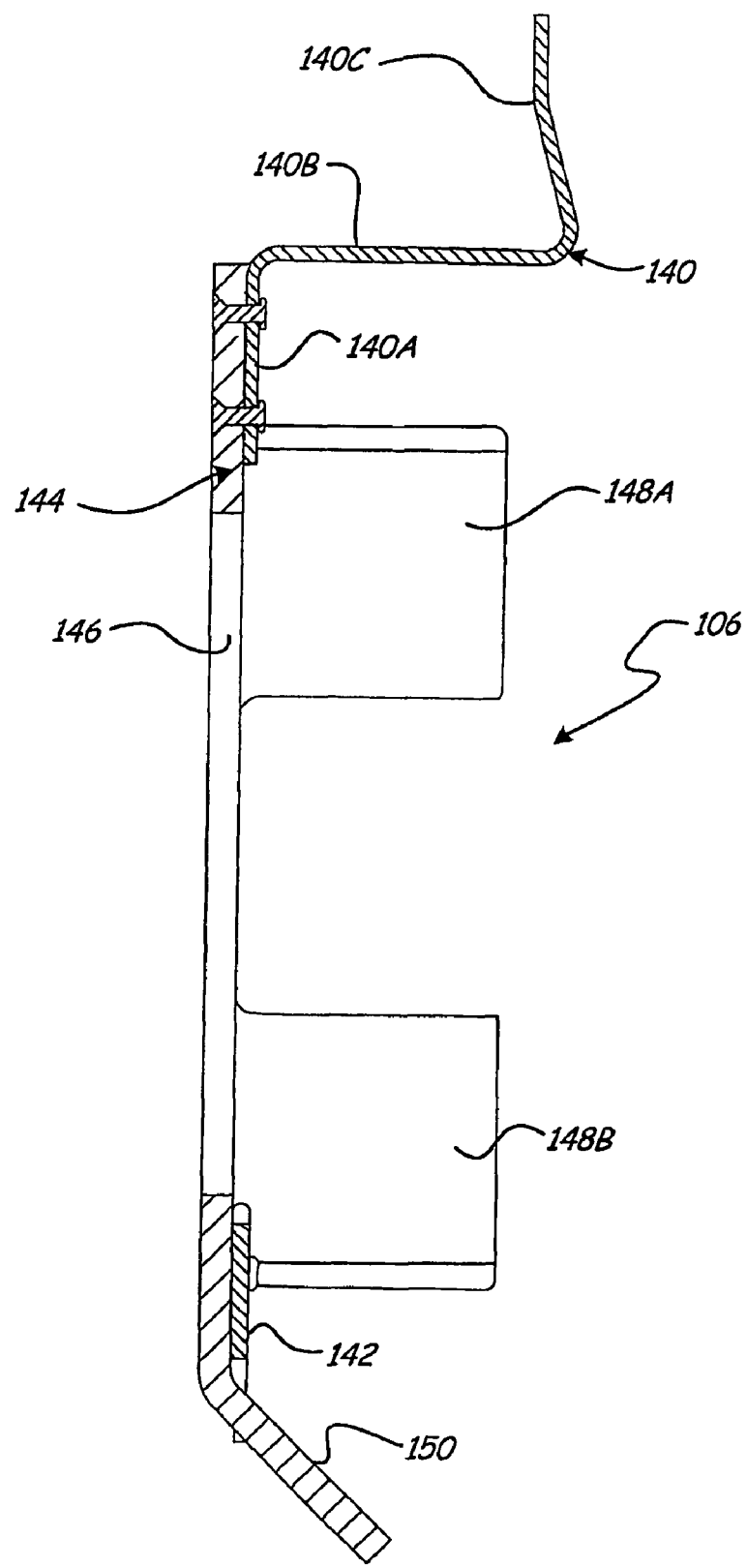
FIG. 6 is a cross-sectional view of the valve assembly, taken along line 6-6 in FIG. 5.

The valve assembly 106 is also mounted on the front side of the rotor 104 (i.e., the side of the rotor 104 facing the front end 110F of the shaft 110). The valve assembly 106 is shown in isolation in FIGS. 4-6, where FIG. 4 is a perspective view, FIG. 5 is a rear view, and FIG. 6 is a cross-sectional view taken along line 6-6 of FIG. 5. As seen in FIGS. 2A-2C and 4-6, the valve assembly 106 includes a cover plate 140, a mounting plate 142 and a "floating" armature 144. The armature 144 is "floating" because it is configured to extend between the front and rear sides of the rotor 104, and is movable relative to the rotor 104. The cover plate 140 and the mounting plate 142 are connected to the armature 144 opposite each other, using rivets or other suitable fastening means.

The cover plate 140 can cover and uncover the opening 138 in the rear plate 112A of the reservoir 112, and is positioned substantially between the reservoir 112 and the rotor 104 on the front side of the rotor 104. The cover plate 140 includes a first portion 140A that is connected to the armature 144, a second portion 140B that extends from the first portion 140A at approximately 90°, and a third portion 140C that extends from the second portion 140B in a direction opposite the first portion 140A. The third portion 140C is angled slightly back toward the armature 144, and defines a seating portion of the cover plate 140 that can seal against the rear plate 112A of the reservoir 112 to close the opening 138 (as shown in FIGS. 2A-2C), which substantially prevents shear fluid from exiting the reservoir 112. The cover plate 140 can be made of a metallic material, such as steel. The cover plate 140 generally permits some flexure to provide a robust seal when in a closed position relative to the reservoir 112. However, the seal formed by the cover plate 140 need not be completely fluid-tight for the clutch 100 to function.

The mounting plate 142 includes first and second mounting protrusions 142A and 142B. Each of the first and second mounting protrusions 142A and 142B is arcuate in shape and provides a hole for securing the valve assembly 106 to the rotor 104 at holes 132A and 132B, respectively, using suitable fasteners such as screws or bolts. A scallop 142C is defined along an outer edge of the mounting plate between the first and second mounting protrusions 142A and 142B. The mounting plate 142 defines a pivot for the valve assembly 106. The mounting plate 142 acts like a leaf spring, and in the present embodiment biases the armature 144 and the cover plate 140 to uncover the opening 138 in the reservoir 112 by default (in FIGS. 2A-2C, the valve assembly 106 is shown in an "off" or closed position with the cover plate 140 covering the opening 138 to restrict fluid flow). Shear fluid can flow out of the reservoir 112 as the cover plate 140 is pivotally moved away from the opening 138 in the rear plate 112A of the reservoir 112, with shear fluid moving out of the reservoir 112 in greater volumes when the valve plate 140 is moved a greater distance away from the opening 138 in the rear plate 112A of the reservoir 112.

The armature 144 is a magnetic flux conducting component that is movable in response to an applied magnetic field. The armature 144 includes a ring shaped base portion 146, which is positioned at the front side of the rotor 104, and has four fingers 148A-148D that extend from the perimeter of the base portion 146 at approximately right angles. Each of the fingers 148A-148D has a slightly arcuate shape to follow the circumference of the base portion 146. A counterweight 150, which can have a dovetail-like shape, extends from the base portion 146 of the armature 144 between the fingers 148B and 148C opposite the cover plate 140. The counterweight 150 can pass through the scallop 142C of the mounting plate 142. The counterweight 150 offsets the mass of the cover plate 140 on the opposite side of the pivot defined by the mounting plate 142. The fingers 148A-148D and the counterweight 150 can be formed integrally with the base portion 146 of the armature, and magnetic flux can flow through from the fingers 148A-148D to the base portion 146 (or vice-versa). The armature 144 is formed by stamping the part from a sheet of metallic material, and then folding the fingers 148A-148D and the counterweight 150 into position. The armature 144 is made of a magnetic flux conducting material, for example, steel.

The base portion 146 of the armature 144 is connected to the mounting plate 142, which enables the entire armature 144 to pivot and to produce generally axial movement at the attached cover plate 140 with respect to the rotor 104. Generally axial movement of the armature 144 can move the cover plate 140 toward or away from the opening 138 in the rear plate 112A of the reservoir 112. Movement of the armature 144 can provide about 2-3 mm of movement of the third portion 140C of the cover plate 140 relative to the rear plate 112A of the reservoir 112.

It is contemplated that the armature 144 can have different configurations in alternative embodiments. For instance, the number of fingers as well as the positions of the fingers can vary as desired. Moreover, the cover plate 140, the mounting plate 142 and the counterweight 150 can also have different configurations from those embodiments shown in the figures.

Figure 7:
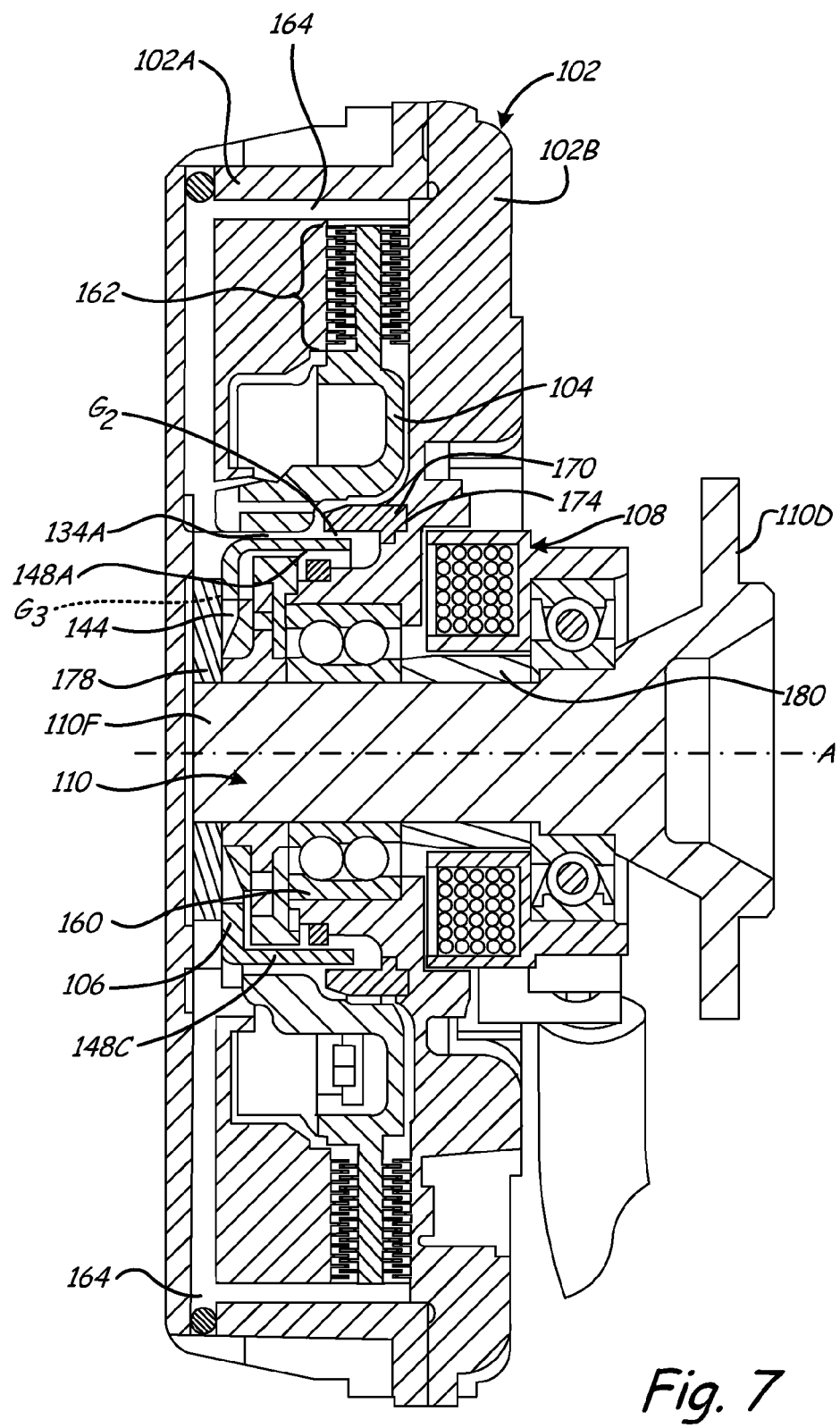
FIG. 7 is a cross-sectional view of the viscous clutch, taken along line 7-7 in FIG. 1.

FIG. 7 is a cross-sectional view of the clutch 100, taken along line 7-7 of FIG. 1. As shown in FIG. 7, the fingers 148A-148D of the armature 144 are positioned to protrude through the arcuate openings 134A-134D, respectively, in the rotor 104 and toward the rear side (or driven side) of the clutch 100. In an alternative embodiment, a magnetic flux conductive stabilizing ring (not shown) can be secured to the distal ends of the fingers on the rear side of the rotor 104. Such a stabilizing ring can hold the fingers 148A-148D of the armature 144 to reduce flexing and increase the surface area of the armature 144 for the transmission of magnetic flux.

The two-part housing 102 provides rotational output from the clutch 100 when engaged for rotation with the rotor 104, and includes a front housing cover part 102A and a rear housing base part 102B that are secured together using bolts, screws or other suitable fasteners. Both the housing cover 102A and the housing base 102B are typically made of a metallic material, such as aluminum. The housing base 102B has a double row bearing set 160 pressed into engagement between an ID of the housing base 102B and the shaft 110. The bearing set 160 is located to the rear side of the rotor 104, and preferably is substantially axially aligned with the fan blades 168 (see FIG. 2A). In this way, the housing 102 is rotationally supported on the shaft 110 independent of the rotor 104, and axial alignment of the bearing set 160 with the fan blades 168 (as well as the working chamber 114) helps balance operational loads on the bearing set 160. Balanced bearing loading can help prevent damage and prolong bearing life. The bearing set 160 allows for relative rotation between the two-part housing 102 and the rotor 104, with the rotor 104 being rotationally fixed to the shaft 110. The housing cover 102A and the housing base 102B are each provided with a series of annular ribs (collectively, each set of ribs is designated by reference number 162) that face the working chamber 114, and are viscously engaged with the sets of annular ribs 124 on the front and rear sides of the rotor 104 to transmit torque when the clutch 100 is engaged (i.e., when shear fluid is introduced into the working chamber 114). The operation of the clutch 100 is explained further below.

As shown in FIG. 7, the housing cover 102A includes a conventional dynamic fluid pump system that operates by building pressure in the shear fluid locally in the working chamber 114 near the OD of the rotor 104. A return path 164 is defined through the housing cover 102A for the shear fluid to move from the OD of the working chamber 114 to the reservoir 112.

The exterior of the housing 102 has cooling fins 166 (see FIGS. 1, 8 and 9) to transfer heat generated by the clutch to the environment surrounding it. Aluminum is typically used to form the housing 102, because of the favorable heat transfer properties of aluminum that help to dissipate heat from the clutch 100. As shown in FIG. 2A, fan blades 168 can be connected to the housing 102 for co-rotation with the housing 102 when the clutch 100 is engaged (the fan blades 168 are omitted in the other figures for simplicity). The fan blades 168 can be part of a unitary fan blade assembly connected to the housing 102 with bolts or screws in a well-known manner.

Figure 8:
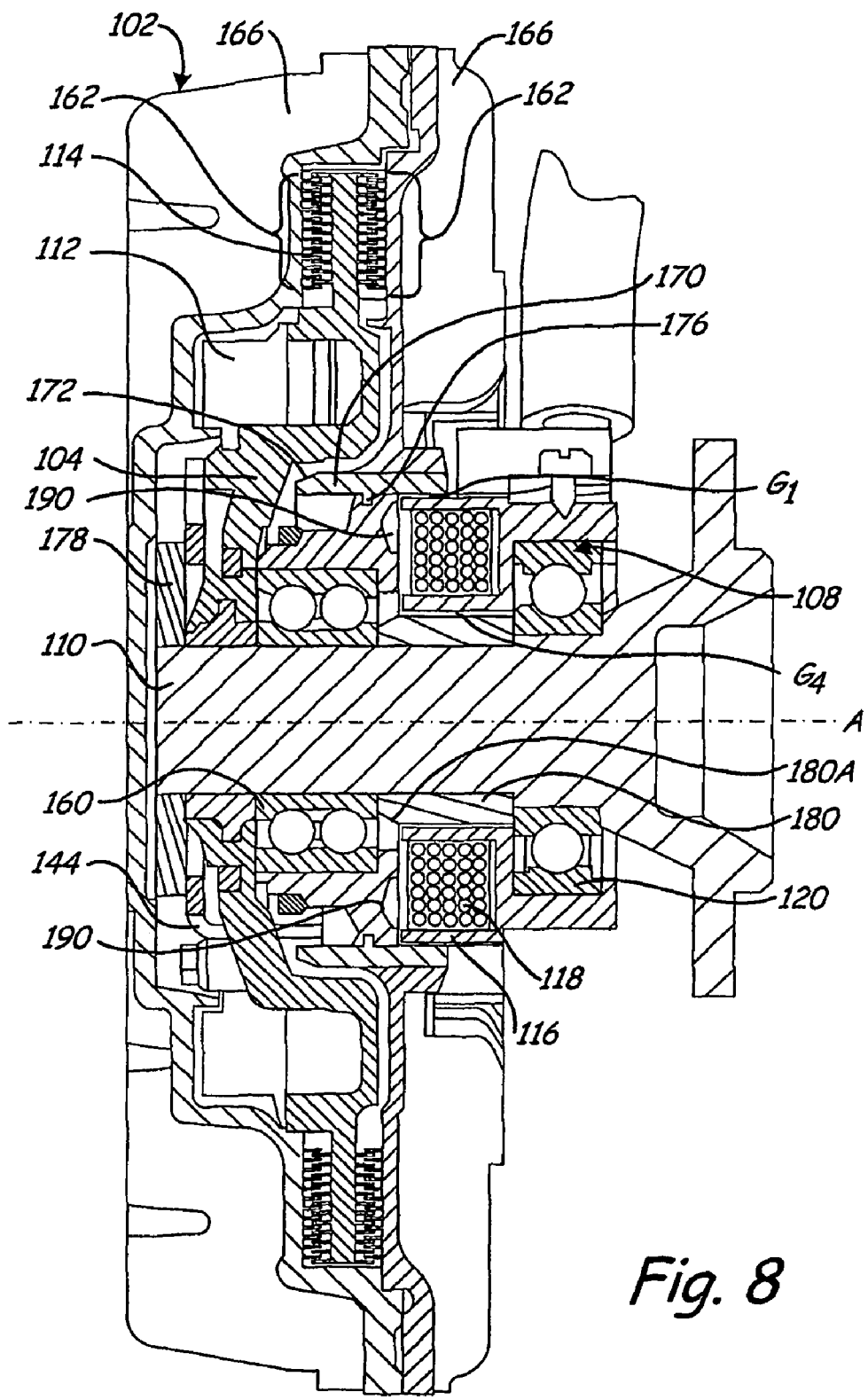
FIG. 8 is a cross-sectional view of the viscous clutch, taken along line 8-8 in FIG. 1.

FIG. 8 is a cross-sectional view of the clutch 100, taken along line 8-8 of FIG. 1. As shown in FIGS. 2A, 2B, 7 and 8, a magnetic flux conductive housing insert 170 is disposed in the housing base 102B, and acts as a magnetic conduit between the electromagnetic coil assembly 108 and the "floating" armature 144 of the valve assembly 106. The housing insert 170 can be made of steel. This magnetically conductive housing insert 170 can be pre-formed in a generally cylindrical shape, with a chamfer 172 at its front outer edge, a plurality of circumferentially spaced scallops 174 at its rear edge (see FIGS. 2A, 2B, 7 and 10) and an inwardly extending radial rib 176. The housing insert 170 is cast within the housing base 102B. The scallops 174 located at the rear edge of the housing insert 170 permit material of the housing 102 (e.g., aluminum) to flow there during casting, thereby providing a more secure connection between the housing insert 170 and the housing base 102B, while still providing a substantially axial magnetic flux path. As shown in FIG. 8, the housing insert extends rearward to a location that is axially rearward of the front of the coil cup 116 of the coil assembly 108, forming a small radial air gap $G_1$ therebetween. The cross-sectional views of FIGS. 2A, 2B and 7 are taken at locations where the scallops 174 extend forward into the housing insert 170, which is shown by the fact that the housing insert 170 has a lesser axial length in FIGS. 2A, 2B and 7 as compared to in FIG. 8 (see also FIG. 10). The radial rib 176 is located at a middle portion of the housing insert 170, and functions to facilitate casting and to help stabilize the housing insert 170 relative to the housing base 102B. The radial rib 176 and the insert scallops 174 allow the housing insert 170 to be secured relative to the housing 102, while a substantial surface area of the insert 170 can remain exposed, that is, uncovered by the material of the housing 102.

As shown in FIG. 7, the fingers 148A and 148C of the armature 144 are positioned in the area of the magnetically conductive housing insert, separated by a small, substantially radial air gap $G_2$. Magnetic flux can pass between the housing insert 170 and the armature 144 across the air gap $G_2$. As the armature 144 moves in response to applied magnetic flux, the relative orientation of the armature with respect to the housing insert 170 will change. However, the air gap $G_2$ remains substantially radially oriented.

As shown in FIGS. 2A, 2B, 7 and 8, a substantially disc-shaped magnetic pole plate 178 is mounted to a front end 110F of the shaft 110 (e.g., by a pressed, knurled connection). The pole plate 178 lies entirely to the front side of the rotor 178, and does not pass through any portion of the rotor 104. The pole plate 178 is fixed to co-rotate with the shaft 110 and the rotor 104, but is not movable like the armature 144. The pole plate 178 is made of a magnetic flux conducting material, such as steel, and acts as a magnetic conduit between the armature 144 and the shaft 110. This pole plate 178 also acts as a stop for the armature 144 when the armature 144 is drawn toward the pole plate 178 by electromagnetic forces (i.e., the armature 144 contacts the pole plate 178 to limit the armature's range of motion). When the clutch 100 is fully disengaged (as shown in all the figures), the base portion 146 of the armature 144 is magnetically drawn into physical contact with the pole pate 178. When the clutch 100 is engaged, there is a small, substantially axial variable air gap $G_3$ present between the pole plate 178 and the armature 144. As will be explained in further detail below, the size of that substantially axial air gap $G_3$ can vary. The location of the air gap $G_3$ is indicated in FIG. 7, though in FIG. 7 the clutch is shown in a disengaged state and the air gap $G_3$ is approximately zero.

During operation, fluid present in the clutch 100 may cause the armature 144 to stick to the pole plate 178, thereby undesirably decreasing clutch response time. In order to mitigate that problem, the rear face of the pole plate 178 can optionally be textured (i.e., made to be non-smooth) or have raised features (e.g., protruding rivet heads) to help prevent the armature 144 from sticking to the pole plate 178. Alternatively or in addition, the front face of the armature 144 can be textured or have raised features to accomplish the same objective.

In addition, as shown in FIGS. 2A, 2B, 7 and 8, a magnetic flux guide sleeve 180 is positioned on the shaft 110 rearward of the bearing set 160, so as to be radially located between the shaft 110 and the coil cup 116 of the electromagnetic coil assembly 108. The flux guide sleeve 180 is axially located between the bearing set 160 for the housing 102 and the bearing set 120 for the electromagnetic coil assembly 108. The flux guide sleeve 180 has a generally cylindrical shape, with a chamfered forward, outer edge 180A. The flux guide sleeve 180 is made of a magnetic flux conductive material (e.g., steel), and can transmit magnetic flux between the shaft 110 and the electromagnetic coil assembly 108. A small radial air gap $G_4$ separates the flux guide sleeve 180 and coil cup 116.

In view of the foregoing description, a flux circuit of the clutch 100 can be understood. The electromagnetic coil assembly 108 can generate magnetic flux as electric current flows through the coil 118. Magnetic flux from the coil assembly 108 can pass across the radial air gap $G_1$ from the coil cup 116 to the housing insert 170. After passing axially through the housing insert 170, magnetic flux can then pass across the substantially radial air gap $G_2$ to the fingers 148A-148D of the armature 144 of the valve assembly 106. Magnetic flux can pass through the fingers 148A-148D to the base portion 146 of the armature 144. By default, when the coil assembly 108 is unpowered and not generating magnetic flux, the armature 144 is biased away from the pole plate 178, and magnetic flux must cross the variable substantially axial air gap $G_3$ in order to travel from the armature to the pole plate 178. Magnetic flux from the coil assembly 108 produces an electromagnetic force that acts upon the armature 144, and can pivotally move the armature 144 toward and into contact with the pole plate 178 to close the axial air gap $G_3$. The pole plate 178 continues the magnetic flux circuit between the armature 144 and the front end 110F of the shaft 110. The shaft 110 can then carry magnetic flux toward the rear (i.e., driven) side of the clutch 100. Magnetic flux then can travel from the shaft 110 through the flux guide sleeve 180 and across the radial air gap $G_4$ back to the coil cup 116 of the electromagnetic coil assembly 108 to complete the flux circuit.

Operation of the clutch 100 generally occurs as follows. The cover plate 140 of the valve assembly 106 is designed such that it is biased to uncover the opening 138 in the rear plate 112A of the reservoir 112 (i.e., an "on" or open position where the clutch 100 is engaged) by default, which permits shear fluid to flow from the reservoir 112 to the working chamber 114. Shear fluid present in the working chamber 114 transmits torque by creating a frictional engagement between the rotor 104 and the housing 102, and the instantaneous percentage of torque transmission can vary as a function of the amount of shear fluid in the working chamber 114.

The valve assembly 106 can be electromagnetically actuated to close the opening 138. When the electromagnetic coil assembly 108 is energized, magnetic flux is generated by the coil 118 and is transmitted through the flux circuit to move the armature 144 toward the pole plate 178, which in turn moves the cover plate 140 toward the opening 138 in the rear plate 112A of the reservoir 112. In this way, energizing the coil assembly 108 causes the clutch 100 to disengage by covering the opening 138 more, which limits or prevents shear fluid from passing from the reservoir 112 to the working chamber 114.

As noted above, the radial channel 128 is formed in the front side of the rotor 104, relative to the location of the cover plate 140 and the opening in the rear plate 112A of the reservoir 112. The radial channel 128 provide space for the cover plate 140 to move axially to cover and uncover the opening 138 in the rear plate 112A of the reservoir 112. In addition, the radial channel 128 and the groove 130 together form a fluid path between the opening 138 from the reservoir 112 to the opening 126A near the OD of the rotor 104. In that way, input of shear fluid to the working chamber 114 occurs at one of the fluid openings (e.g., fluid opening 126A), which provides a fluid outlet that is substantially centered axially in the rotor and is substantially radially centered relative to the annular ribs 124 (and 162). Locating the fluid outlet at or near the axial center of the rotor 104 permits feeding shear fluid to the working chamber 114 at both the front and rear sides of the rotor substantially simultaneously, as well as permitting feeding the shear fluid to the working chamber 114 amidst the annular ribs 124 near the OD of the rotor 104. Providing shear fluid to the working chamber 114 near the OD of the rotor 104 and at both sides of the rotor 104 simultaneously both help to improve clutch response times.

During operation, the fluid pump system that includes the fluid return path 164 pumps shear fluid from the working chamber 114 back to the reservoir 112. Shear fluid is essentially continuously pumped back from the working chamber 114 to the reservoir 112. The clutch 100 remains engaged only by continuing to keep the valve assembly 106 in an open position, allowing more shear fluid to move (i.e., return) from the reservoir 112 to the working chamber 114. Conversely, the working chamber 114 can be effectively drained by moving the valve assembly 106 to a fully closed position, and preventing shear fluid from returning to the working chamber 114.

A variety of alternative control schemes are possible for operating the clutch 100. In one embodiment, the electromagnetic coil assembly 108 can be energized in a coarse on/off manner such that the valve assembly 106 remains in a fully open position (the default position) or in a fully closed position when the coil assembly is selectively energized.

In another embodiment, the coil assembly 108 is energized using pulse width modulated (PWM) signals from an electronic engine controller (not shown). PWM signals allow a dynamically variable average volume of shear fluid to flow out of the reservoir 112. PWM signals cause the coil assembly 108 to generate magnetic flux in a pulsed manner over time. Depending on the pulse width (i.e., duration) and frequency of PWM signals, the valve assembly 106 can variably adjust the amount of shear fluid allowed to pass out of the reservoir 112 through the opening 138 to the working chamber 114 over time. That is, the PWM signals cause the coil assembly 108 to open and close the valve assembly 106, and the average amount of time that the valve assembly 106 is open dictates the average amount of shear fluid that flows out of the reservoir 112. Greater pulse widths and/or greater frequencies of PWM signals will tend to close the valve assembly 106 more on average, allowing lower average volumes of shear fluid to pass to the working chamber 114. This PWM control scheme permits the clutch 100 to be operated at selectively variable speeds, such that the housing 102 (and attached fan blades 168) can rotate at anywhere from 0% to approximately 100% of the rotational speed of the rotor 104 and the shaft 110, rather than merely in a coarse on/off fashion. PWM signal frequencies in a range of about 0.5-5 Hz are suitable.

Because a stable position of the armature 144 between the open and closed positions cannot be achieved for a small stroke actuator in an electromagnetic actuator system, the armature 144 will tend to one of the limiting end positions (i.e., fully open or closed). Therefore, the PWM frequency must be set relatively low to allow the armature disk to reach the end positions in every duty cycle. However, PWM frequencies that are too low may be unfavorable because changes in fan 168 (and housing 102) speed can produce undesirable audible noise fluctuations as fan speed changes in response to individual pulses of PWM signals. Thus, PWM signal frequencies near about 2 Hz are preferred.

It should also be noted that the small air gap $G_3$ limits the maximum of magnetic flux and therefore the maximum of the magnetic energy of the system, which has to be relieved when the coil assembly 108 is switched off. With a larger air gap $G_3$, the reaction time of the valve assembly 106 can be increased, but the achievable magnetic force to move the valve assembly 106 is slightly decreased. Thus, the air gap $G_3$ should account for the other design characteristics of the clutch 100.

A problem faced with operating electromagnetically actuated viscous clutches is that the configuration of such clutches may have the unintended consequence of effectively forming a transformer adjacent to the magnetic flux circuit. Aluminum is a material commonly used for clutch components because it is relatively lightweight, relatively inexpensive, castable, paramagnetic and has desirable strength and heat transfer properties. However, because aluminum can conduct electricity, portions of the housing 102 and/or the rotor 104 adjacent to the flux circuit can act effectively as secondary windings. It takes a relatively long time for eddy currents in aluminum to dissipate as heat. This can affect movement of the armature 144, and can undesirably slow the response time of the clutch 100 by keeping the valve assembly 106 in an open or closed position. It has been found that eddy current effects can have a substantial effect on clutch response time, an even greater effect than the mass of the armature 144. This is particularly undesirable when the clutch 100 is controlled using a PWM control scheme. The effect of eddy currents on the clutch 100 is generally greatest when the coil assembly 108 stops providing magnetic flux (i.e., is switched off) in an attempt to bias the armature 144 from the closed position to the default open position, because less magnetic flux is needed to hold the armature 144 in the closed position than is required to move the armature 144 from the open position to the closed position.

Figure 9:
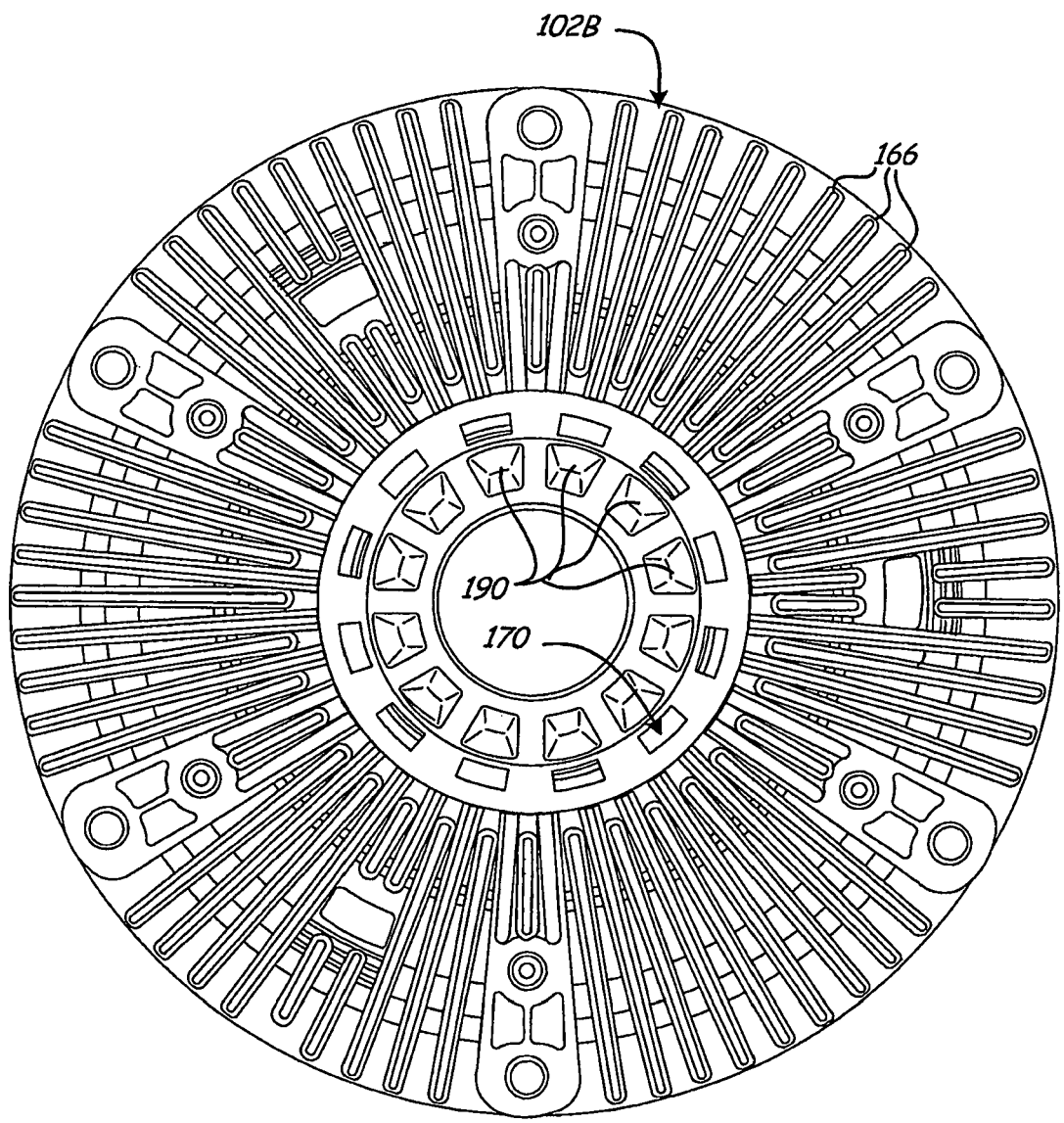
FIG. 9 is a rear view of the housing of the viscous clutch of FIGS. 1-2C, 7 and 8.
Figure 10:
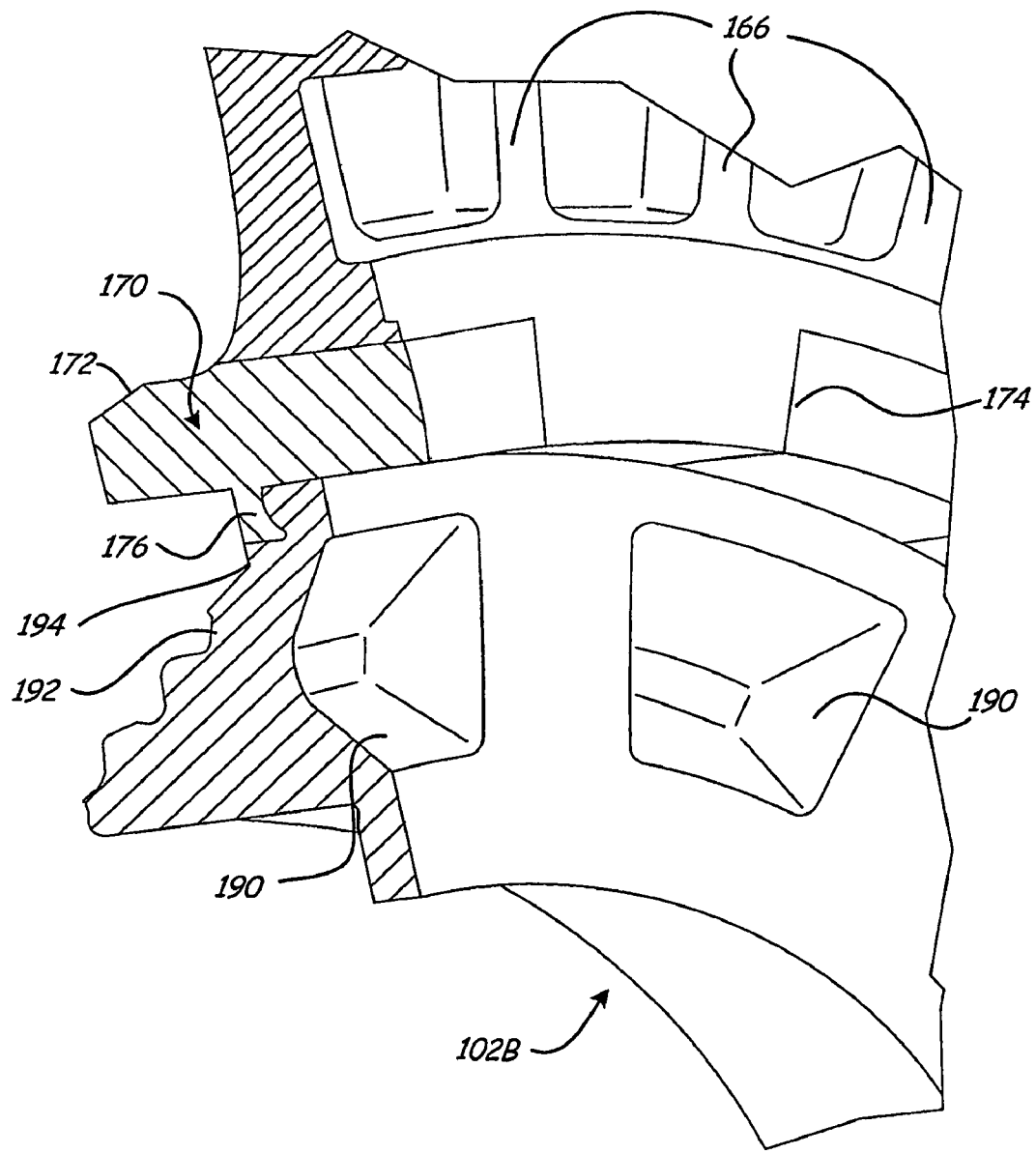
FIG. 10 is a cross-sectional perspective view of a portion of the housing of FIG. 9.

In order to mitigate eddy current problems, the clutch 100 can include an eddy current reducing feature located adjacent to the magnetic flux circuit. In one embodiment, the eddy current reducing feature comprises special housing geometry that forms an interrupting pattern in the housing base 102B. FIG. 9 is a rear view of the housing base 102B of the clutch 100 shown in isolation. FIG. 10 is a cross-sectional perspective view of a portion of the housing base 102B. As shown in FIGS. 8, 9 and 10, twelve equally circumferentially spaced scallops 190 form recesses in the rear (driven) side of the housing base 102B near the ID of the housing 102. The scallops 190 are formed radially inward of the housing insert 170, so as to be located relative to the interior of the flux circuit. The scallops 190 have a teardrop-like shape, with a wide opening facing rearward and narrowing toward the front side of the housing base 102B. However, the scallops 190 can have other shapes and configurations in alternative embodiments. The scallops 190 function to reduce the amount of material that is disposed adjacent to the flux circuit. More particularly, as shown in FIG. 8, the scallops 190 reduce the amount of electrically conductive material of the housing 102 forming a closed ring in a location that is generally axially adjacent to the shaft 110 at the interior of the flux circuit, thereby reducing the conduction of eddy currents.

Figure 11:
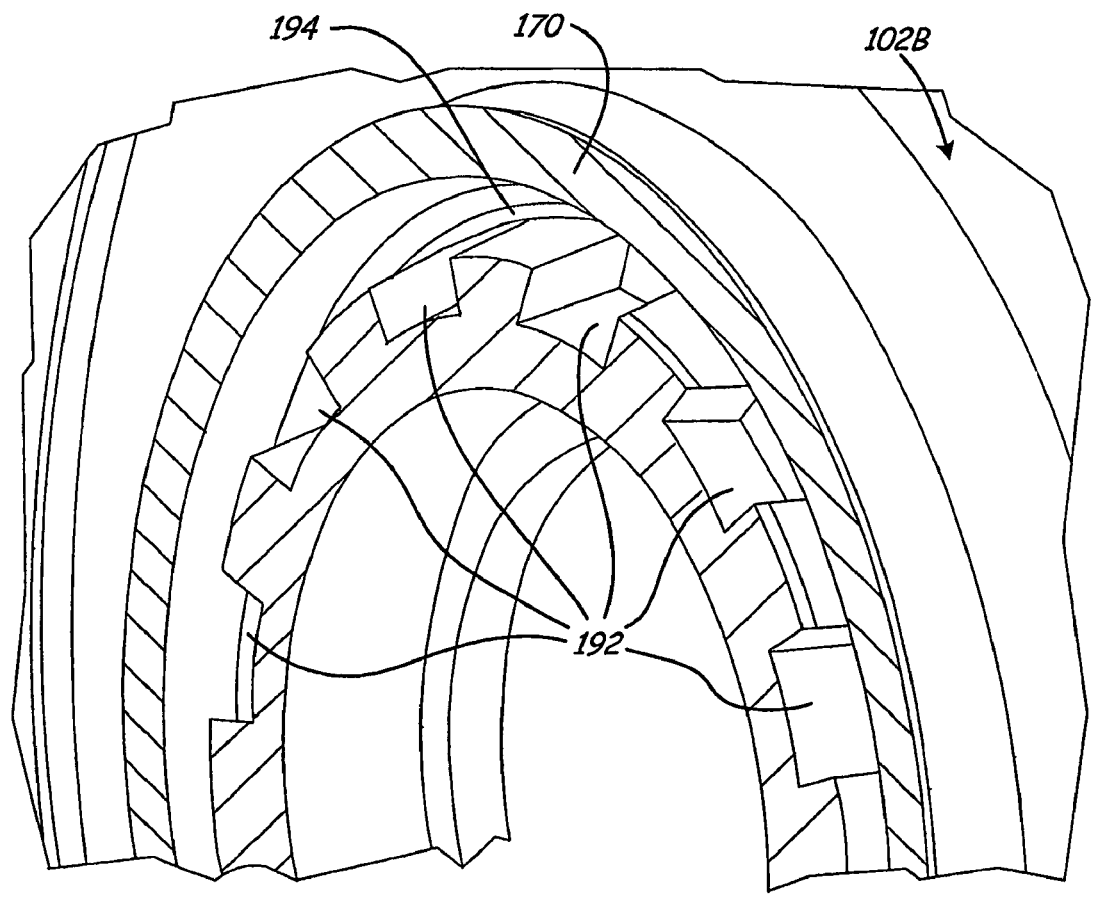
FIG. 11 is a cross-sectional perspective view of a front side of the portion of the housing of FIGS. 9 and 10.

Additionally, the special eddy current reducing geometry can include formations on the front side of the housing base 102B. FIG. 11 is a cross-sectional perspective view of a portion of the housing base 102B shown from the front side. As shown in FIGS. 10 and 11, front side scallops 192 are formed on the front side of the housing base 102B. Twelve equally circumferentially spaced front side scallops 192 are positioned near the ID of the housing base 102B, such that the front side scallops 192 are located along an annular channel 194 positioned radially between the housing insert 170 and the ID of the housing base 102B where the bearing set 160 is located. The front side scallops 192 are arranged to align with the scallops 190 on the rear side of the housing base 102B. In that way, the scallops 190 and 192 reduce the amount of electrically conductive material located adjacent to the magnetic flux circuit. Rib-like structures are formed between adjacent scallops 190 and 192, which help provide sufficient mechanical strength to the housing 102.

Similarly, the rotor 104 can be formed with a special geometry that forms electrical interrupting features to reduce eddy currents in the clutch 100 adjacent to the flux circuit. Such an eddy current reducing feature can be formed in conjunction with or in place of an eddy current reducing feature of the housing 102.

In an alternative embodiment, the eddy current reducing feature is a special material used in the clutch 100 adjacent to the flux circuit. A portion of the housing base 102B between it's ID and approximately the location of the housing insert 170, the entire housing base 102B or the entire housing 102 can be made of a paramagnetic material that is a poor electrical conductor, such as magnesium, to reduce the conduction of eddy currents adjacent to the magnetic flux circuit of the clutch 100. Likewise, in further embodiments, the rotor 104 or a portion of the rotor 104 can be made of a non-electrical conducting material, such as magnesium. The use of such a special materials, like magnesium, limits any eddy current that would otherwise develop adjacent to the flux circuit, and can thereby help improve clutch response time.

It will be recognized that the present invention provides an efficient, effective and reliable viscous clutch having numerous advantages. For instance, a clutch according to the present invention can have its reservoir configured to move with the rotor, which imparts kinetic (rotational) energy to the shear fluid for faster delivery to the working chamber when a valve assembly for the reservoir is opened. Delivery of shear fluid to the working chamber is also improved and quickened by delivering fluid through approximately the axial center of rotor for dispersal to working chamber at both front and back sides substantially simultaneously, as well as to deliver the shear fluid near the OD of the rotor. In addition, the clutch of the present invention provides efficient magnetic flux transmission through a flux circuit that has relatively few air gaps. No more than four air gaps are required, which reduces a loss of electromagnetic force due to even greater numbers of air gaps. Moreover, the air gaps in a clutch according to the present invention can be more generally radially oriented, and radial air gaps generally permit more consistent and precise tolerances than axially oriented air gaps. Furthermore, a clutch according to the present invention can include an eddy current reducing feature to mitigate undesired magnetic flux circuit performance loss. All the foregoing benefits help improve clutch response time, which is a measure of how quickly a clutch can adjust its degree of engagement between an input and an output. Good clutch response time is particularly important where a clutch is controlled using a PWM control scheme to provide dynamically variable clutch engagement. In addition to the foregoing benefits, the design of the clutch according to the present invention also facilitates assembly and disassembly for repair.

Although the present invention has been described with reference to preferred embodiments, workers skilled in the art will recognize that changes may be made in form and detail without departing from the spirit and scope of the invention. For instance, the particular structures and configuration of a clutch according to the present invention can vary as desired for particular applications.

The invention claimed is:

1. A viscous clutch assembly comprising:
   a rotational input structure comprising a material capable of conducting magnetic flux;
   a rotor attached to the rotational input structure;
   a selectively rotatable member surrounding the rotor and rotatably supported by the rotational input structure;
   an electromagnetic coil positioned at a driven side of the rotor;
   a valve assembly including a cover plate for regulating flow of a shear fluid, wherein the valve assembly is supported by the rotor; and
   a magnetic flux circuit for controlling the valve assembly with magnetic flux generated by the electromagnetic coil, wherein the magnetic flux circuit is configured to include no more than four air gaps, and wherein a portion of the flux circuit extends between the driven side of the rotor and an opposite front side of the rotor.

2. The assembly of claim 1, wherein the valve assembly comprises:
   an armature, wherein at least a portion of the armature is disposed to extend between the driven side of the rotor and the front side of the rotor.

3. The assembly of claim 1, wherein the valve assembly further comprises:
   an armature having a base portion and one or more fingers extending from the base portion.

4. The assembly of claim 3, wherein the armature further comprises:
   a counterweight extending from the base portion, wherein the counterweight is located generally opposite the cover plate.

5. The assembly of claim 1, and further comprising:
   a reservoir for holding the shear fluid, and wherein the cover plate is disposed between the rotor and the reservoir.

6. The assembly of claim 5, wherein the reservoir is mounted to the front side of the rotor.

7. The assembly of claim 5, wherein the reservoir is adapted to rotate with the rotor.

8. The assembly of claim 1, and further comprising:
   a bearing set rotatably supporting the selectively rotatable member on the rotational input structure; and
   a rotational output attached to the selectively rotatable member, wherein the rotational output is substantially positioned in axial alignment with the bearing set relative to an axis of rotation of the rotational input structure.

9. The assembly of claim 1, wherein the cover plate is spring biased, and wherein control of the valve assembly is achieved by the magnetic flux acting against the spring bias of the cover plate.

10. The assembly of claim 9, wherein the cover plate is spring biased to an open position by default, wherein the open position allows shear fluid flow.

11. The assembly of claim 1, wherein a portion of the housing located adjacent to the flux circuit comprises an interrupting feature for reducing eddy currents.

12. The assembly of claim 1, wherein a portion of the rotor located adjacent to the flux circuit comprises an interrupting feature for reducing eddy currents.

13. A viscous clutch assembly comprising:
   a shaft comprising a magnetic flux conducting material, wherein the shaft defines an axis of rotation;
   a rotor mounted to the shaft;
   a housing surrounding the rotor to define a working chamber defined between the rotor and the housing;

a reservoir mounted on the rotor and having a reservoir opening;

an electromagnetic coil disposed at or near an exterior surface of the housing, wherein the electromagnetic coil can generate magnetic flux;

a valve assembly comprising:
an armature;
a mounting plate attached to the armature; and
a cover plate attached to the armature opposite the mounting plate, and wherein the cover plate is disposed substantially between the reservoir and the rotor, and wherein the cover plate is positioned to selectively cover the reservoir opening;

a magnetic flux conducting insert positioned in the housing for carrying magnetic flux from the electromagnetic coil to the armature, wherein the armature and the magnetic flux conducting insert are separated by a substantially radial air gap;

a magnetic flux conducting pole plate mounted on the shaft for carrying magnetic flux between the armature and the shaft, and wherein magnetic flux can be carried from the shaft to the electromagnetic coil to complete a flux circuit, wherein a portion of the flux circuit extends between front and rear sides of the rotor.

14. The assembly of claim 13, wherein a surface of the pole plate adjacent to the armature is at least partially non-planar.

15. The assembly of claim 13, wherein a surface of the armature adjacent to the pole plate is at least partially non-planar.

16. The assembly of claim 13, wherein the armature comprises:
a base portion; and
one or more fingers extending from the base portion.

17. The assembly of claim 16, wherein the base portion of the armature is annular in shape.

18. The assembly of claim 16 and further comprising:
a counterweight extending from the base portion of the armature generally opposite the cover plate.

19. The assembly of claim 13 and further comprising:
a bearing set rotatably supporting the housing on the shaft; and
a fan blade assembly attached to the housing, wherein the fan blade assembly is positioned in substantially axial alignment with the bearing set for stabilizing the transmission of forces therebetween.

20. The assembly of claim 13, wherein the mounting plate of the valve assembly acts as a spring to bias the cover plate, and wherein control of the valve assembly by the magnetic flux acts against the spring bias provided by the mounting plate.

21. The assembly of claim 13, wherein the electromagnetic coil is positioned at a rear side of the housing.

22. The assembly of claim 13, wherein the magnetic flux conducting insert and the electromagnetic coil are separated by a radial air gap.

23. The assembly of claim 13, wherein the armature and the magnetic flux conducting pole plate are separable by a substantially axial air gap.

24. The assembly of claim 13, wherein the viscous clutch assembly is configured such that magnetic flux can be transmitted from the shaft to the electromagnetic coil across a radial air gap.

25. The assembly of claim 13, wherein a portion of the housing located adjacent to the shaft comprises an interrupting feature for reducing eddy currents.

26. A flux circuit assembly for a viscous clutch having a rotor and a housing surrounding the rotor, the flux circuit assembly comprising:
an electromagnetic coil;
a magnetic flux conducting insert positioned in the housing and adjacent to the electromagnetic coil and separated therefrom by a first air gap, wherein the first air gap is a radial gap;
an armature positioned adjacent to the insert and opposite the electromagnetic coil, and separated from the insert by a second air gap, wherein the second air gap is a substantially radial gap, and wherein the armature extends between a front side and a rear side of the rotor;
a magnetically conductive pole plate disposed adjacent to the armature and opposite the insert in the housing, wherein the armature is capable of contacting the pole plate to close a third air gap therebetween, and wherein the third air gap is a substantially axial gap; and
a magnetically conductive shaft, wherein the pole plate is mounted to the shaft, and wherein a fourth air gap is located adjacent to the electromagnetic coil between a portion of the shaft and the electromagnetic coil, and wherein the fourth air gap is a radial gap.

27. The assembly of claim 26, wherein the flux circuit assembly does not require more than four air gaps.

28. The assembly of claim 26, wherein a portion of the housing comprises an interrupting feature for reducing eddy currents.

29. The assembly of claim 26, wherein a portion of the rotor comprises an interrupting feature for reducing eddy currents.

* * * * *

UNITED STATES PATENT AND TRADEMARK OFFICE
CERTIFICATE OF CORRECTION

| | | |
|---|---|---|
| PATENT NO. | : 7,938,240 B2 | Page 1 of 1 |
| APPLICATION NO. | : 11/989495 | |
| DATED | : May 10, 2011 | |
| INVENTOR(S) | : Hennessy et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this
Fourth Day of October, 2011

David J. Kappos
*Director of the United States Patent and Trademark Office*